UNITED STATES PATENT OFFICE 2,551,813

FREE RADICAL ADDITION OF H₂S TO OLEFINS

Paul Swithin Pinkney, Wilmington, Del., assignor to E. I. du Pont de Nemours and Company, Wilmington, Del., a corporation of Delaware No Drawing. Application February 25, 1949, Serial No. 78,473

12 Claims. (Cl. 260—609)

This invention relates to the preparation of organic sulfur compounds and more particularly to the reaction of hydrogen sulfide with ethylenically unsaturated compounds.

This application is a continuation in part of application Serial No. 756,554, filed June 23, 1947.

Published accounts show that the addition of hydrogen sulfide to ethylenically unsaturated compounds is difficult. The yields of addition products obtained by the use of catalysts is generally low and such addition products as are obtained usually have the structure expected according to Markownikoff's rule.

This invention has as an object the provision of a process for the preparation, in high yield, of mercaptans and sulfides from readily available starting materials. A further object is a process for the "abnormal" addition of hydrogen sulfide to ethylenically unsaturated organic materials. Other objects will appear hereinafter.

These objects are accomplished by the present invention wherein hydrogen sulfide is reacted with an ethylenically unsaturated compound in the presence of an azo catalyst which has an acyclic azo group, —N=N—, bonded to different carbons which are non-aromatic, i. e., aliphatic or cycloaliphatic, and at least one of which is tertiary and has attached through carbon, a negative radical which has the three remaining valences of the latter carbon satisfied only by at least one element of atomic number of 7 to 8 (oxygen and/or nitrogen). The negative radical is generally neutral with respect to acidity and includes the nitrile, carbalkoxy and carbonamide groups. The hydrogen sulfide-ethylenic products obtained (mercaptans and/or sulfides) have structures which are not predicted by the Markownikoff rule.

In general, this invention may be illustrated by the reaction of excess hydrogen sulfide with an ethylenic compound such as an olefin, e. g., an octene with 1–5% of an azonitrile catalyst.

The following examples in which parts are by weight are illustrative of the invention.

*Example I*

Into a stainless steel pressure-resistant vessel having a capacity of 400 parts of water were placed 84 parts of purified octene-1, and 1.5 parts each of alpha,alpha'-azodiisobutyronitrile and 1,1'-azodicyclohexanecarbonitrile. The vessel was closed and charged with hydrogen sulfide under a pressure of about 225 lbs./sq. in. and the pressure maintained at this value during the reaction period. During an eleven-hour period, the temperature was raised gradually from 75° to 110° C. There was obtained a total of 102 parts of product by distillation under reduced pressure. Fractional distillation of this product gave 10.7 parts of octene-1, 26.5 parts of n-octyl mercaptan, 55.3 parts of di-n-octyl sulfide and 4.6 parts of residue.

*Example II*

Into a stainless steel pressure-resistant vessel having a capacity of 400 parts of water were placed 82 parts of cyclohexene and 2 parts of alpha,alpha'-azodiisobutyronitrile. The vessel was closed and charged with hydrogen sulfide under a pressure of about 225 lbs./sq. in. and heated for about 14 hours at 70–95° C. during which time the pressure was maintained at 225 lbs./sq. in. Upon distillation of the product, a total of 49 parts of cyclohexene was recovered, and on the basis of the cyclohexene not thus recovered, there was obtained a 28% yield of cyclohexyl mercaptan and 40% yield of cyclohexyl sulfide.

*Example III*

When the general procedure of Example II was repeated except that the azonitrile was omitted, no mercaptan or sulfide was obtained. When the example was repeated with two parts of benzoyl peroxide employed in place of the azonitrile catalyst, no mercaptan or sulfide was obtained.

*Example IV*

A pressure-resistant vessel was charged with 96 parts of octene-2, 2 parts of 1,1'-azodicyclohexanecarbonitrile, and hydrogen sulfide under a pressure of about 225 lbs./sq. in. The vessel and contents were heated at 85–110° C. for about 15 hours during which time the pressure was maintained at 225 lbs./sq. in. Upon distillation of the reaction product there was recovered 53 parts of octene-2, and on the basis of the octene-2 consumed, a 65.7% yield of the mercaptan and a 15.3% yield of the sulfide was obtained.

*Example V*

A pressure-resistant vessel was charged with 112 parts of octene-1, 2 parts of alpha,alpha'-azobis(alpha,gamma-dimethylvaleronitrile), and 98 parts of hydrogen sulfide. The vessel was closed and the contents heated for 4 hours at 55–56° C. There was recovered about 6 parts of octene-1 and on the basis of the octene-1 consumed, there was obtained a 73% yield of n-octyl mercaptan and a 23.9% yield of di-n-octyl sulfide.

Example VI

A pressure-resistant vessel was charged with 90.6 parts of hexadecene-1, 78 parts of cyclohexane, 3 parts of alpha,alpha'-azodiisobutyronitrile, and 100 parts of hydrogen sulfide. The vessel was closed and the contents heated for 4 hours at 77–93° C. Upon distillation of the reaction product, 10 parts of hexadecene-1 was recovered. There was obtained a 71.8% yield of n-hexadecyl mercaptan and a 17.5% yield of di-n-hexadecyl sulfide on the basis of the olefin reacted.

Example VII

A pressure-resistant vessel was charged with 101 parts of octadecene-1, 58.5 parts of cyclohexane, 2 parts of alpha,alpha'-azodiisobutyronitrile, and 130 parts of hydrogen sulfide. The vessel was closed and the contents heated for 3 hours at 85–90° C. Upon distillation of the product there was recovered 5 parts of octadecene-1 and on the basis of the octadecene-1 reacted, there was obtained a 69% yield of n-octadecyl mercaptan and a 22.6% yield of di-n-octadecyl sulfide.

Example VIII

A pressure-resistant vessel was charged with 84 parts of tetramethylethylene, 3 parts of alpha,alpha'-azodiisobutyronitrile and 120 parts of hydrogen sulfide. The vessel was closed and the contents heated for 8 hours at 75–85° C. Upon distillation of the reaction product, 15 parts of tetramethylethylene was recovered and on the basis of the tetramethylethylene reacted there was obtained a 35% yield of the mercaptan and a residue (3.5 parts) which contained the corresponding sulfide.

Example IX

Into a stainless steel pressure-resistant vessel were placed 104 parts of styrene, 1 part of alpha,alpha'-azodiisobutyronitrile and 170 parts of hydrogen sulfide. The vessel was closed and the contents heated for 4 hours at 80° C. The product was purified by washing with 10% aqueous sodium bicarbonate and dried over anhydrous sodium sulfate. Fractional distillation gave 84 parts of 2-phenylethyl mercaptan boiling at 100° C. under 18 mm. pressure and 42 parts of bis(2-phenylethyl) sulfide boiling at 170–175° C. at 3 mm.

Example X

Into a stainless steel pressure-resistant vessel were placed 112 parts of oleic acid, 2 parts of 1,1'-azodicyclohexanecarbonitrile and 150 parts of hydrogen sulfide. The vessel was closed and the contents heated for 10 hours at 95–100° C. Upon distillation under reduced pressure, 72 parts of oleic acid was recovered and 43 parts of the corresponding mercaptostearic acid was obtained.

Example XI

A mixture of 260 parts of isopropyl oleate, 300 parts of hydrogen sulfide and 4 parts of alpha,alpha'-azodiisobutyronitrile was heated for 8 hours at 80° C. in a stainless steel pressure-resistant container. A total of 63 parts of isopropyl oleate was recovered by distillation. The residue (191 parts) was the corresponding isopropyl mercaptostearate which had the following analysis:

Calculated for $C_{21}H_{42}SO_2$: S, 8.94%.
Found: S, 8.87%.

A portion of mercaptostearate obtained in the above manner was oxidized by an acetic acid solution of hydrogen peroxide to give the corresponding stearic acid having a sulfonic acid group in place of the mercapto group.

Example XII

A mixture of 116 parts of allyl alcohol, 170 parts of hydrogen sulfide and 1 part of alpha,alpha'-azodiisobutyronitrile was heated for 4 hours at 80° C. in a stainless steel pressure-resistant container. Distillation of the reaction products gave 71.5 parts of 3-mercaptopropanol (B. P. at 9 mm., 72–73° C., $n_D^{25}$ 1.4921) and 45 parts of bis(3-hydroxypropyl) sulfide (B. P. at 2 mm. 137–140° C.).

Example XIII

When the general procedure of Example XII was repeated except that 72.5 parts of allylidene diacetate was substituted for the allyl alcohol, a total of 29 parts of allylidene diacetate was recovered and 25 parts of 3-mercaptopropylidene diacetate obtained which boiled at 87–88° C. at 2 mm. pressure and had the following analysis:

Calculated for $C_7H_{12}O_4S$: S, 16.68%.
Found: S, 17.11%.

Example XIV

A mixture of 114 parts of allylamine, 150 parts of hydrogen sulfide and 2 parts of azodiisobutyronitrile was heated in a stainless steel pressure-resistant vessel for 3 hours at 85–90° C. Upon distillation, 67 parts of allylamine was recovered and there was obtained 20 parts of 3-mercaptopropylamine (B. P. 127° C., M. P. 48.5° C.) and 19 parts of bis(3-aminopropyl) sulfide (B. P. 115–120° C. at 7 mm.).

Example XV

A mixture of 198 parts of dimethyl $\Delta$4-tetrahydrophthalate, 204 parts of hydrogen sulfide and 2 parts of alpha,alpha'-azodiisobutyronitrile was heated for 6 hours at 80–85° C. in a pressure-resistant stainless steel vessel. Fractional distillation under reduced pressure resulted in the recovery of 147 parts of the unreacted phthalate. There was also obtained 31 parts of dimethyl 4-mercaptohexahydrophthalate boiling at 140–145° C. at 2 mm. pressure and having the following analysis:

Calculated for $C_{10}H_{16}O_4S$: S, 13.81%.
Found: S, 13.63%.

Example XVI

A mixture of 86.5 parts of 4-vinylcyclohexene, 200 parts of hydrogen sulfide and 1 part of alpha,alpha'-azodiisobutyronitrile was heated for one hour at 90° C. in a stainless steel pressure-resistant vessel. A total of 15 parts of 4-vinylcyclohexene was recovered upon fractional distillation. There was obtained 38 parts of an unsaturated thiol boiling at 83–98° C. at 19 mm., 15.5 parts of a dithiol boiling at 90–93° C. at 1.5 mm. and 23 parts residue. Redistillation of the dithiol gave a fraction which boiled at 92–93° C. at 1.5 mm., had $n_D^{25}$ 1.5391, and the following analysis:

Calculated for $C_8H_{10}S_2$: S, 36.38%.
Found: S, 36.40%.

Example XVII

Thirty parts of an oily polymer of butadiene having a molecular weight of about 1500 to 2000 was dissolved in 48 parts of cyclohexane. To this was added 1 part of alpha,alpha'-azodiisobutyronitrile and 102 parts of hydrogen sulfide. After heating the reaction mixture for 2 hours at 80–85° C. in a closed steel vessel, the reactor and contents were cooled and the excess hydrogen sulfide removed. The liquid was filtered and solvent removed by evaporation under vacuum. There was thus obtained 53.5 parts of a gray viscous liquid which contained 13.8% sulfur.

*Example XVIII*

A total of 18 parts of a low molecular weight butadiene/ethyl acrylate polymer which had an iodine number of 60.4 and butadiene content of 12.3% was dissolved in a mixture of about 80 parts of cyclohexane and 40 parts of absolute ethanol. To this solution was added 1 part of alpha,alpha'-azodiisobutyronitrile and 102 parts of hydrogen sulfide. After a reaction period of 6 hours at about 80° C., the liquid reaction product was removed, filtered and volatiles evaporated. There was obtained 20 parts of a viscous liquid which had a sulfur content of 4.1%. The polymeric material was changed by this reaction to a product which gelled rapidly on exposure to air as compared to the original polymer which was not changed upon exposure to air.

*Example XIX*

A pressure-resistant vessel was charged with a solution of 10 parts of pale crepe rubber in 90 parts of benzene and 1 part of alpha,alpha'-azodiisobutyronitrile. The vessel was closed, attached to a hydrogen sulfide source and heated for 4 hours at 80–84° C. under a pressure of 195 lbs./sq. in. There was obtained a jelled polymer which was tough and non-sticky and which crumbled on a mill. In contrast to these properties, a control sample treated as above but without the azonitrile catalyst gave a soft sticky, millable polymeric material.

The method of this invention can be applied to ethylenically unsaturated compounds in general. Thus, hydrogen sulfide has been added to low molecular weight ethyenically unsaturated compounds and to rubber as shown in Example XIX. The molecular weight of the olefinic compound is not important in view of the fact that rubber of probable molecular weight of 50,000 to 200,000 undergoes this reaction. However the more reactive compounds are those which have a molecular weight of less than 3000 and of these the most useful are olefinic compounds of 18 carbons or less which have carbon, hydrogen and oxygen as the only elements. Of these the olefinic hydrocarbons, i. e., aliphatic and cycloaliphatic compounds having 1–2 ethylenic groups and 2–18 carbons such as ethylene, propylene, amylenes, tetramethylethylene, 4-methyl-2-pentene, heptene-1, octadecene-1, etc., are particularly preferred. Ethylenic compounds which have 1–3 hydrogens on the ethylenic carbons generally react faster and are generally preferred. Also useful are diethylenic compounds including butadiene, and vinylcyclohexene, and ethylenically unsaturated compounds which have further groups, e. g., allyl acetate, vinyl acetate, methyl acrylate, isopropyl oleate, allyl alcohol, styrene, diethyl maleate, etc.

As shown in the examples, an azo compound induces the reaction of hydrogen sulfide with ethylenically unsaturated compounds to form mercaptans and sulfides in high yields. This is further demonstrated by reference to Example III which demonstrates that in the absence of any catalyst or in the presence of a peroxide, the addition reaction does not take place.

The azo catalysts employed in the process of this invention have an acyclic azo group, —N=N—, bonded to different non-aromatic, i. e., aliphatic or cycloaliphatic carbons, at least one of which is tertiary, i. e., attached to three other carbons by single valences, with the tertiary carbon attached through carbon to a negative radical in which the three remaining valences of the latter carbon are satisfied by at least one element of atomic number 7 to 8. The negative radicals are preferably neutral with respect to acidity and include the nitrile, carbonamide and carbalkoxy groups. In general the carbalkoxy groups have alkyl radicals of 1–6 carbons.

Examples of azo catalysts which may be used in the process of this invention which have one tertiary carbon are the azo compounds which may be prepared by the process described by Thiele and Stange, Ann. 283, 33–37 (1894), and include alpha(carbamylazo)isobutyronitrile, alpha(carbamylazo) - alpha - methylenanthonitrile, alpha(carbamylazo) - alpha - phenylpropiontrile, alpha(carbamylazo) - alpha-cyclopropylpropionitrile, alpha(carbamylazo) - alpha,alpha - dicyclohexylacetonitrile, alpha(carbamylazo)isobutyramide, alpha(carbamylazo) - alpha,gamma - dimethylvaleramide, and hexyl alpha(carbamylazo)-alpha,gamma-dimethylvalerate.

Azo catalysts which are symmetrical and accordingly have two tertiary groups attached to the azo nitrogens, i. e., have a tertiary carbon attached to each azo nitrogen are preferred since they are usually active 10–20° C. lower than those having only one tertiary group, i. e., one tertiary carbon attached to an azo nitrogen. Examples of these preferred compounds include alpha,alpha'-azodiisobutyronitrile, alpha,alpha' - azobis-(alpha,gamma-dimethylvaleronitrile), alpha,alpha'-azobis(alpha - methylenanthonitrile), alpha,-alpha' - azobis-(alpha-ethylbutyronitrile); alpha,-alpha'-azobis(alpha-phenylpropionitrile), alpha,-alpha' - azobis(alpha - cyclopropylpropionitrile), alpha,alpha' - azobis(alpha-cyclohexylpropionitrile), alpha,alpha'-azobis(alpha-cycloheptylpropionitrile), alpha,alpha'-azobis(alpha-isopropyl-beta-methylbutyronitrile), alpha,alpha'-azobis-(alpha,-gamma-dimethylcapronitrile), alpha,alpha'-azobis(alpha-n-butylcapronitrile),alpha,alpha' - azobis(alpha-isobutyl-gamma-methylvaleronitrile), alpha,alpha' - azobis(alpha-methyl-gamma-carboxybutyronitrile) and the corresponding salts such as the sodium salt of the carboxy group, 1,1'-azodicyclohexanecarbonitrile, 1,1'-azodicycloheptanecarbonitrile,1,1'-azobis-(3-methylcyclopentanecarbonitrile), 1,1'-azobis(2,4-dimethylcyclohexanecarbonitrile), the polymeric azonitrile derived from 2.15-cetanedione and the azonitrile derived from camphor (1,1'-azodicamphanecarbonitrile) by the method subsequently described, and the corresponding amides and esters of the above in which the nitrile group or groups are replaced by amide and/or ester groups, e. g., to give alpha-alpha'-azodiisobutyramide, alpha,alpha' - azobis(alpha,gamma-dimethylvaleramide), alpha,alpha' - azobis(alpha-cyclopropylpropionamide), 1,1' - azodicyclohexanecarbonamide, N,N'-diethyl-alpha-alpha'-azodiisobutyramide, dimethyl, diethyl and dihexyl alpha,alpha'-azodiisobutyrate, etc. Preferably lower alkyl esters, e. g., of the 1–6 carbon alcohols are used as catalysts in view of the ease and economy in preparing such esters.

The azonitriles may be prepared by the process described by Thiele and Heuser, Ann. 290, 1–43, (1896), Hartmann, Rec. trav. chim. 46, 150–153

(1927), Dox, J. Am. Chem. Soc. 47, 1471–1477 (1925). A convenient method (Alderson and Robertson Serial No. 736,586, now Patent No. 2,469,358, filed March 22, 1947) consists in the reaction of hydrazine with a ketone to form an azine which is reacted with excess hydrogen cyanide in a system of low water content to give the azonitrile. The azonitrile can be converted to amides or esters by formation of the iminoether hydrochloride by reaction with hydrogen chloride and an alcohol followed by reaction with ammonia or hydrogen-bearing amine or with water.

Generally the more useful azo catalysts have aliphatic and/or cycloaliphatic radicals of 4–11 carbons on each of the azo nitrogens and usually have carbon and hydrogen or carbon, hydrogen and oxygen as the elements in the radical excepting the negative substituent on the tertiary carbon. Preferably the catalysts are symmetrical azobisnitriles having hydrocarbon radicals as the only other substituents. The azobis(cyanoalkanes) of 4–11 carbons are particularly preferred.

In general, the azo catalyst is present in the reaction system in amounts of from 0.1 to 5% by weight based on the weight of ethylenically unsaturated compound. However, smaller amounts, e. g., as low as 0.01% or less are effective. Amounts above 5%, e. g., 10% or more may be used but the relative expense of such large amounts of catalyst generally precludes their use.

The temperature at which the reaction is effected depends upon the specific catalyst, ethylenically unsaturated compound and the reaction rate desired. Although temperatures within the range of 55–110° C. have been illustrated in the examples, temperatures of 40–150° C. may be used, depending on the specific catalyst and reaction rate desired. The reaction rate is high at temperatures at which the particular catalyst employed decomposes rapidly into the fragments which initiate the reaction. With a given catalyst an increase in temperature generally results in a higher reaction rate. A plurality of azo catalysts may be employed as in Example I to lengthen the active temperature range. Generally the reaction takes place in ½ to 10 hours, although the specific time employed may be varied.

The hydrogen sulfide may be in the liquid state if the pressure is high and the temperature relatively low. In general for desirable rates of reaction, the pressure is from 15–500 lbs./sq. in. or higher, the maximum pressure generally being limited by the strength of the reaction vessel available. The hydrogen sulfide is generally present in excess on a molar basis as compared to the ethylenically unsaturated compound. The ratio of mercaptan to sulfide in the product of the reaction is generally higher when the ratio of hydrogen sulfide to ethylenic compound is high.

This reaction may be effected in the presence of solvents which are not reactive under the reaction conditions. Examples of such solvents are cyclohexane, dioxane, tertiary-butyl alcohol, xylene, etc.

The mercaptans and sulfides obtained by the process of this invention are useful as modifiers for synthetic rubbers, whether during or after polymerization. They also are useful as intermediates for the preparation of various sulfur-containing derivatives, e. g., oxidation of the higher mercaptans as obtained from 12 to 20-carbon olefins gives surface active sulfonic acids.

The foregoing detailed description has been given for clearness of understanding only and no unnecessary limitations are to be understood therefrom. The invention is not limited to the exact details shown and described for obvious modifications will occur to those skilled in the art.

What is claimed is:

1. In the addition of hydrogen sulfide to an ethylenically unsaturated compound, the improvement wherein the ethylenically unsaturated compound is reacted with the hydrogen sulfide in contact with an azo compound which has an acyclic azo, —N=N—, group bonded to discrete non-aromatic carbons, at least one of which is tertiary and has attached, through carbon, a negative radical which has the three remaining valences of said carbon satisfied only by elements of the class consisting of oxygen and nitrogen.

2. In the addition of hydrogen sulfide to an ethylenically unsaturated compound, the improvement wherein the ethylenically unsaturated compound is reacted with the hydrogen sulfide in contact with a symmetrical azo compound which has its acyclic azo, —N=N—, group bonded to discrete tertiary carbons, each of which has attached, through carbon, a negative radical which has the three remaining valences of said carbon satisfied only by elements of the class consisting of oxygen and nitrogen.

3. In the addition of hyrogen sulfide to a non-aromatic, ethylenically unsaturated hydrocarbon, the improvement wherein the ethylenically unsaturated compound is reacted with the hydrogen sulfide in contact with a symmetrical azo compound which has its acyclic azo, —N=N—, group bonded to discrete tertiary carbons, each of which has attached, through carbon, a negative radical which has the three remaining valences of said carbon satisfied only by elements of the class consisting of oxygen and nitrogen.

4. In the addition of hydrogen sulfide to a non-aromatic, ethylenically unsaturated hydrocarbon, the improvement wherein the ethylenically unsaturated compound is reacted with the hydrogen sulfide in contact with a symmetrical azo compound which has its acyclic azo, —N=N—, group bonded to discrete tertiary carbons, each bonded to a nitrile group.

5. In the addition of hydrogen sulfide to a non-aromatic, ethylenically unsaturated hydrocarbon, the improvement wherein the ethylenically unsaturated compound is reacted with the hydrogen sulfide in contact with an 1,1'-azobis(1-cyanoalkane) wherein the two carbons each attached to azo nitrogen and a cyano group are tertiary.

6. In the addition of hydrogen sulfide to a terminally ethylenically unsaturated hydrocarbon, the improvement wherein the hydrocarbon is reacted with hydrogen sulfide in contact with an azo compound which has an acyclic azo, —N=N—, group bonded to discrete non-aromatic carbons, at least one of which is tertiary and has attached, through carbon, a negative radical which has the three remaining valences of said carbon satisfied only by elements of the class consisting of oxygen and nitrogen.

7. In the addition of hydrogen sulfide to a terminally ethylenically unsaturated hydrocarbon, the improvement wherein the hydrocarbon is reacted with hydrogen sulfide in contact with a symmetrical azo compound which has its acyclic azo, —N=N—, group bonded to discrete tertiary carbons, each bonded to a cyano group.

8. In the addition of hydrogen sulfide to a terminally ethylenically unsaturated hydrocarbon, the improvement wherein the hydrocarbon is reacted with hydrogen sulfide in contact with an 1,1-azobis(1-cyanoalkane) wherein the two carbons each attached to azo nitrogen and a cyano group are tertiary.

9. In the addition of hydrogen sulfide to a terminally ethylenically unsaturated hydrocarbon, the improvement wherein the hydrocarbon is reacted with hydrogen sulfide in contact with alpha,alpha'-azodiisobutyronitrile.

10. In the addition of hydrogen sulfide to a terminally ethylenically unsaturated hydrocarbon, the improvement wherein the hydrocarbon is reacted with hydrogen sulfide in contact with alpha,alpha'- azobis(alpha,gamma - dimethylvaleronitrile).

11. In the addition of hydrogen sulfide to a terminally ethylenically unsaturated hydrocarbon, the improvement wherein the hydrocarbon is reacted with hydrogen sulfide in contact with 1,1'-azodicyclohexanecarbonitrile.

12. In the addition of hydrogen sulfide to a terminally ethylenically unsaturated hydrocarbon, the improvement wherein the hydrocarbon is reacted with hydrogen sulfide in contact with an azo compound which has an acyclic azo, —N=N—, group bonded to discrete tertiary nonaromatic carbons each in a cyanohydrocarbon radical with the cyano group on said tertiary carbon.

PAUL SWITHIN PINKNEY.

REFERENCES CITED

The following references are of record in the file of this patent:

UNITED STATES PATENTS

| Number | Name | Date |
|---|---|---|
| 2,411,961 | Evans et al. | Dec. 3, 1946 |
| 2,411,983 | Vaughn et al. | Dec. 3, 1946 |
| 2,471,959 | Hunt | May 31, 1949 |